United States Patent Office

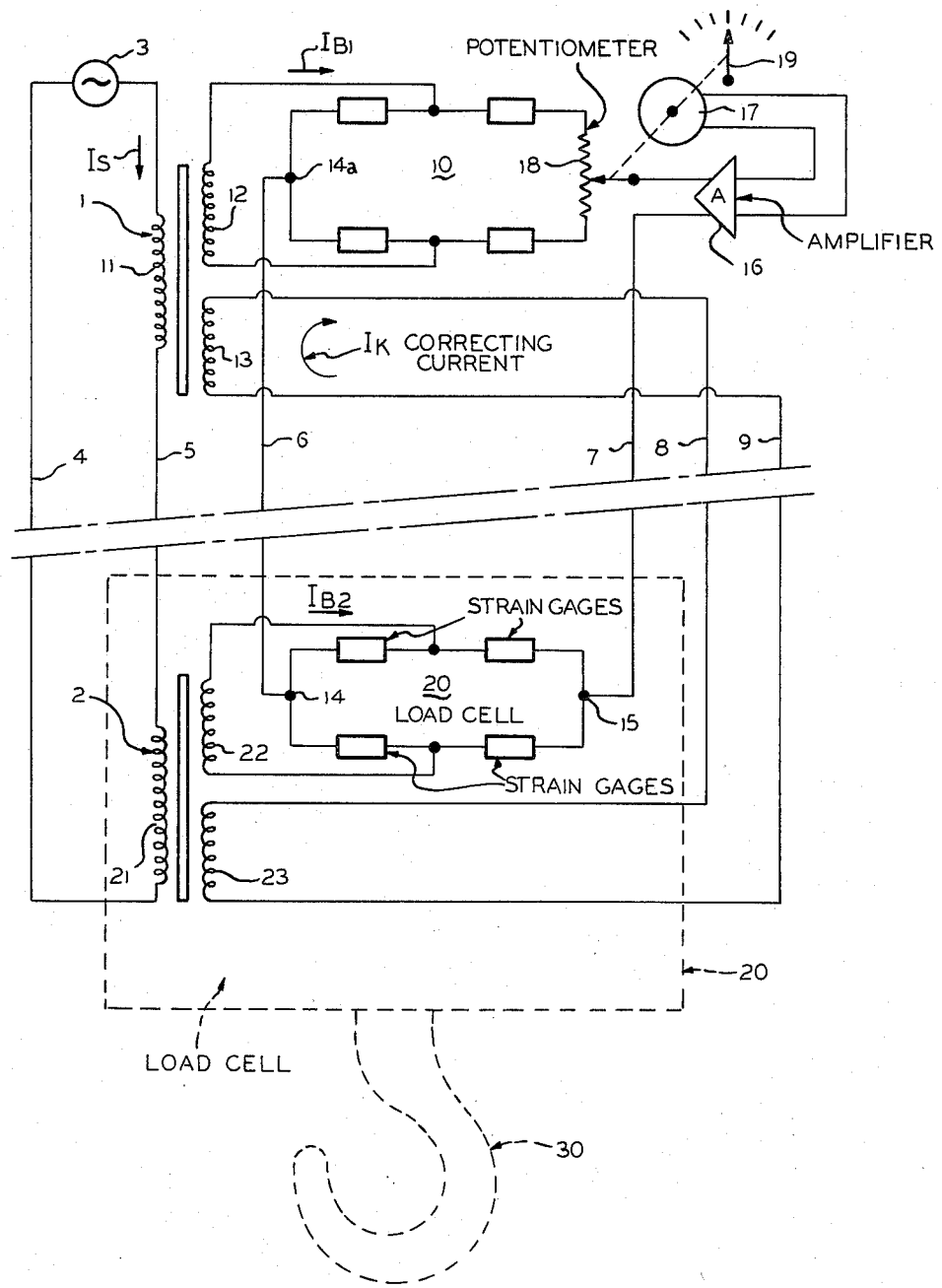

3,100,546
Patented Aug. 13, 1963

3,100,546
CIRCUIT WITH COMPENSATED TRANSFORMER
Johannes F. Cramwinckel, Voorburg, Netherlands, assignor to Maatschappij van Berkel's Patent N.V., Rotterdam, Netherlands, a company of the Netherlands
Filed July 17, 1961, Ser. No. 124,436
Claims priority, application Germany July 15, 1960
3 Claims. (Cl. 177—211)

This invention relates in general to a measuring circuit, and more particularly to a measuring circuit especially useful in connection with crane scales for measuring weight.

Still more particularly, the invention relates to a strain gauge measuring circuit constructed in accordance with the zero compensation method with alternating current supply, and wherein the measuring and compensation elements are spaced apart a relatively large distance, especially as may be encountered with crane scales.

The present invention includes a load cell having strain gauges which is mounted on a hoisting cable of a crane and having connected thereto a crane hook which is adapted to be connected to elements to be weighed. Thus, the crane scale may be used to weigh various relatively heavy elements. A compensating circuit is provided which consists generally of a Wheatstone bridge with a servo-motor driven potentiometer that may be mounted in the cabin of the crane or on the floor in a remote location from the crane hook. Thus, to electrically connect the compensating circuit and load cell, cables having great lengths such as up to 300 feet may be needed with small diameter and high flexibility, while commutator rings or contacts may be also incorporated in between same. With cable lengths of over 300 feet, the cable resistance can be such that changes in this resistance with temperature would have a marked influence on the measuring accuracy of the scale.

The present invention employs a compensating transformer arrangement wherein a transformer is included in the load cell construction and in the compensation bridge.

Heretofore, where transformers have been used in this manner, the primary coils or windings of the transformers have been connected in parallel and to a voltage source with low internal resistance, whereby the secondary voltages are in phase and have the correct wave form. However, this arrangement is disadvantageous since the primary loss-impedance appears in series with the transformer coupling impedance and the load, and both impedances are variable which might change the ratio between both secondary voltages.

The above disadvantage is overcome in the present invention wherein at least two transformers are provided, one for the load cell and one for the compensation bridge, and whereby the primary windings of both transformers are being supplied from a constant current source or are connected in series, whereby the same current flows through both primary windings, the secondary windings are connected to the load cell and compensation bridge, and a tertiary winding is provided on each transformer. The tertiary windings are connected in parallel and therefore the tertiary currents are practically zero. Separate conductors may be provided to supply a constant current to both primary coils of the transformers, or the primary coils may be connected in series. The conductors connecting the tertiary coils carry currents only if both voltages are unequal or the wave forms are incorrect. As current in these conductors is small, the voltage that appears over the conductor resistance is also small and therefore both tertiary windings have nearly the same voltage. This causes harmonics to be generated in the transformers (the permeability being current-dependent) but this effect is overcome through the parallel connection of the tertiary coils. The circuit of the present invention makes it possible to measure with a high degree of accuracy (better than .1 of one percent).

Accordingly, it is an object of the present invention to provide a measuring circuit capable of producing exceptionally accurate measurements in connection with use on a crane scale.

Another object of this invention is in the provision of a circuit for use in connection with measuring devices such as load cells wherein a compensation bridge is provided in combination with the load cell but mounted at a remote location, and wherein a transformer is provided for the load cell and one for the compensation bridge and thereby providing a compensating transformer feed which produces a highly accurate measuring unit.

Other objects, features, and advantages of the invention will be apparent from the following detailed disclosure, taken in conjunction with the accompanying sheet of drawing, wherein like reference numerals refer to like parts, in which:

The single FIGURE of the drawing is a schematic view of the circuit in accordance with the invention.

Referring now to the drawing, a pair of identical transformers 1 and 2 are provided in connection with the measuring circuit, wherein the transformer 1 is located with the compensation bridge and the transformer 2 is located with the load cell. The transformer 1 includes a primary coil 11, a secondary coil 12, and a tertiary coil 13, while the transformer 2 includes a primary coil 21, a secondary coil 22 and a tertiary coil 23. The primary coils 11 and 21 are connected in series with an alternating current voltage supply 3, through conductors 4 and 5, whereby the same current supply is fed to both transformers so that the current in both are equal. If desired, any other method of attaining equal current in the transformers may be employed.

The transformer 1 feeds a compensation bridge 10 through the secondary coil 12, while the transformer 2 feeds a load cell 20 through the secondary coil 22. Bridge outputs 14 and 15 of the load cell and 14a and 18 of the compensation bridge are connected in series and to the input of an amplifier 16. Further, the conductor 6 interconnects the outputs 14 and 14a, while a conductor 7 interconnects the output 15 with the input of the amplifier 16. The tertiary coils 13 and 23 of the transformers are connected in parallel through the conductors 8 and 9.

A servo-motor 17 is powered from the output of amplifier 16, and drives the wiper of a potentiometer 18 and a pointer 19 of an indicator until the voltages on the bridges 14—15 and 14a—18 are of the same amplitude and in opposite phase. Then the conductors 6 and 7 are current-free as soon as the system has balanced, so the cable resistance has no influence on the circuitry.

The load cell 20 and the transformer 2 are mounted as a unit, and have a crane hook 30 extending therefrom for receiving loads to be weighed.

The pointer 19 on the indicator, being also driven by the motor 17 indicates the displacement of the potentiometer wiper in accordance with the applied weight on the crane hook 30.

Inasmuch as the transformers are supplied with alternating current by means of the alternator 3, current variations have the same effect on both transformers and therefore do not change the relation between the output voltages, and therefore such variations do not cause errors. The conductors 8 and 9 are practically current-free, but with impedance changes a small current $I_k$ will appear which merely serves to overcome the differences in the output voltages of both transformers and is always of a small dimension compared with the current $I_s$. In tertiary coils 13 and 23, only a small current $I_k$ is present, causing only a small voltage drop over the resistance in the tertiary coils and the conductors connecting same so that both driving electromotive forces in coils 13 and 23 are almost equal.

Thus, due to the foregoing, it is seen that a highly accurate measuring circuit is provided in connection with strain gauges and especially useful on crane scales.

It will be understood that modifications and variations may be effected without departing from the scope of the novel concepts of the present invention, but it is understood that this application is to be limited only by the scope of the appended claims.

The invention is hereby claimed as follows:

1. A measuring device comprising a weighing element and an indicator element wherein the elements are separated a relatively large distance from each other, said weighing element including a load cell and a transformer supplying power thereto through its secondary coil, said indicator element including a compensation bridge, a transformer supplying power to said bridge through a secondary coil, a potentiometer in said compensation bridge having a wiper arm, an amplifier, an indicator having an indicator needle, a servo-motor driving said wiper arm and indicator needle, said compensation bridge and load cell being connected in series and to the input of said amplifier, and the primary coils of said transformers being connected in series with a source of alternating current voltage, and a tertiary coil in each transformer, said tertiary coils being connected in parallel.

2. A measuring device comprising a weighing element having a load cell, and an indicator element having a compensation bridge wherein the elements are separated by a relatively large distance from each other, said device including a pair of transformers, each transformer having primary, secondary and tertiary coils, one transformer located with the weighing element and having its secondary connected to said load cell and the other transformer located with the indicator element and having its secondary connected to said compensation bridge, means for supplying equal power to said transformer primary coils, and means for connecting said tertiary coils in parallel.

3. A measuring device comprising a load cell and a compensation bridge connected in series, a pair of transformers, one with the load cell and the other with the compensaton bridge, each transformer having primary, secondary and tertiary coils, means supplying a constant current to the primary coils of said transformers, means connecting said tertiary coils in parallel, means connecting said secondary coils to said load cell and compensation bridge respectively, means for balancing said compensation bridge, means reading the weight applied to said load cell, and means connecting said load cell and compensation bridge in series to said reading means.

References Cited in the file of this patent

UNITED STATES PATENTS

| | | |
|---|---|---|
| 2,708,730 | Alexander | May 17, 1955 |
| 2,918,270 | Golding | Dec. 22, 1959 |
| 2,937,861 | Maring | May 24, 1960 |